Patented May 25, 1954

2,679,508

UNITED STATES PATENT OFFICE 2,679,508

PHOSPHORIC ACID ESTERS AND THEIR PRODUCTION

Hans Gysin, Basel, Switzerland, assignor to J. R. Geigy A. G., Basel, Switzerland, a Swiss firm No Drawing. Application April 19, 1951, Serial No. 221,950

Claims priority, application Switzerland May 6, 1950

6 Claims. (Cl. 260—461)

This invention is concerned with new phosphoric acid esters and with their production. The new phosphoric acid esters are of the general formula:

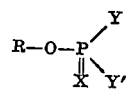

wherein R represents a $\Delta^{1,2}$-cyclohexenone-yl radical which may be alkyl substituted, X represents oxygen or sulphur, and Y and Y' represent alkoxy, alkoxyalkoxy, halogenalkoxy or alkylmercapto radicals.

It has been found that these compounds have an excellent insecticidal activity which is similar to that of the most active aromatic-aliphatic phosphoric acid esters such as p-nitrophenyldiethyl-thiophosphate. The toxicity, however, of the new compounds for warm blooded animals is considerably less than that of the above mentioned phosphoric acid esters, so that they are most suitable for the production of agents for combatting pests.

The new compounds can be produced by reacting aliphatic phosphoric acid ester halides or thiophosphoric acid ester halides of the general formula:

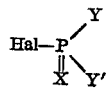

wherein Hal represents chlorine or bromine and X, Y and Y' have the meanings given above, with alkyl substituted or unsubstituted enolisable 1.2- or 1.3-cyclohexanediones or their metal salts.

The reactions can take place in the presence or absence of inert solvents such as benzene, toluene, dioxan, ethyl acetate, etc. If free cyclohexanediones are used, it is advantageous to add acid binding agents such as sodium or potassium carbonate.

Thiophosphoric acid esters can also be produced in an analogous manner by first reacting aliphatic phosphorous acid ester halides of the general formula:

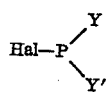

wherein Hal, Y and Y' have the meanings given above, with alkyl substituted or unsubstituted enolisable 1,2- or 1,3-cyclohexanediones or their metal salts and then treating the cycloaliphatic-aliphatic phosphorous acid esters so obtained of the general formula:

with sulphur or compounds giving off sulphur. The sulphuration can take place in the presence or absence of high boiling solvents such as o-dichlorobenzene, trichlorobenzene, polybromobenzene, α- and β-chloronaphthalene, etc., at temperatures of from 160–200°, in which process catalysts such as sodium polysulphides or phosphorus pentasulphide may be added.

It is also possible but less advantageous to react the cycloaliphatic compound with phosphoric acid halides or thiophosphoric acid halides before the aliphatic compound. This is done for example by reacting phosphorus oxychloride with one mol of the sodium compound of cyclohexanedione-(1.3) and then reacting the phosphoric acid monoester dichloride so obtained with two mols of ethyl alcohol or sodium alcoholate.

In particular, compounds derived from low aliphatic alcohols and mercaptans come into question as phosphoric ester halides of the general formula:

Such low aliphatic alcohols and mercaptans are, e. g. methanol, ethanol, n-propanol, isopropanol, allylalcohol, butyl alcohols and amyl alcohols, methoxyethanol, ethoxyethanol, ethylene chlorohydrine, ethylene fluorohydrine, methyl-, ethyl-, n-propyl-, isopropyl- and allyl mercaptan, and also butyl- and amyl-mercaptans. Some of the ester halides are already known. The other phosphoric acid ester halides can be produced in an analogous manner, e. g. by reacting phosphorus oxyhalides or phosphorus thiohalides with two mols of the corresponding alcohols or mercaptans or their metal compounds. Thiophosphoric ester halides may also be obtained by sulphurating phosphorus acid dialkylester halides.

As phosphoric acid ester halides may be named: phosphoric acid or thiophosphoric acid-dimethylester chloride, diethylester chloride, -diethylester bromide, -methylethylester chloride, -dipropylester-chloride, -diisopropylester chloride, -diallylester chloride, thiophosphoric acid-O.S.-diethylester chloride, dithiophosphoric acid-S.S-diethylester chloride, dithiophosphoric acid-O.S-diethylester chloride; trithiophosphoric acid-dimethylester chloride, -diethylester chloride.

Alkyl substituted 1.2- and 1.3-cyclohexanediones insofar as they are enolisable, i. e. containing hydrogen at the carbon atom beside or between the ketone groups, may be used as cyclohexanediones as well as cyclohexanedione-(1.2) (dihydrobrenzcatechin) and cyclohexanedione-(1.3) (dihydroresorcinol). 5-methyl dihydroresorcinol and 5.5-dimethyl dihydroresorcinol (dimedone) come into question as this type of alkyl substituted compounds, and also 1-methyl cyclohexanedione (2.3), 1-methyl cyclohexanedione-(2.4), 1-methyl cyclohexanedione-(2.3), 1-methyl cyclohexanedione-(2.4), 1-methyl cyclohexanedione-(2.6), 1-methyl cyclohexanedione-(3.4), 1.3-dimethyl cyclohexanedione-(4.5), 1-isopropyl cyclohexanedione-(3.5), 1.1.2-trimethyl cyclohexanedione-(4.5), 1-methyl-4-isopropyl cyclohexanedione-(2.3), [=p=menthanedione-(2.3), buchucamphor or diosphenol], 1-methyl-4-isopropyl cyclohexanedione-(2.6) (=p-menthanedione-(2.6)), all of which are known.

The following examples serve to illustrate the invention. Parts are always given as parts by weight and temperatures are in degrees centigrade.

EXAMPLE 1

500 parts of benzene and 70 parts of dehydrated potassium carbonate are added to 112 parts of dihydroresorcinol and the water formed on neutralisation is removed by azeotropic distillation. The reaction product is then cooled to 60°; 190 parts of diethyl thiophosphoric acid chloride are added dropwise, whereupon the whole is heated for 10 hours under reflux to complete the reaction. When cool, potassium carbonate solution is added until a phenolphthalein alkaline reaction is obtained and the mixture is well stirred. The aqueous portion is then removed from the benzene layer. After distilling off the benzene, dihydroresorcyl-diethylthiophosphoric acid ester is obtained as a reddish coloured almost odourless liquid which cannot be distilled without a little decomposition. The raw product is suitable for the production of active insecticidal sprays and dusting agents.

EXAMPLE 2

162 parts of dimedone sodium (produced for example from dimedone and a calculated amount of caustic soda lye and careful evaporation to dryness) are suspended in 500 parts of toluene and then heated with 175 parts of diethyl phosphoric acid chloride for 8 hours under reflux. On completion of the reaction, the sodium chloride which has been formed is filtered off and the solvent is distilled off. [5.5-dimethylcyclohexene-Δ¹,² - one-(3)-yl]-diethyl phosphoric acid ester remains as a pale coloured liquid and can be used without any further purification for the production of active insecticidal preparations.

The following compounds can be produced in a manner analogous to those described in Examples 1 and 2:

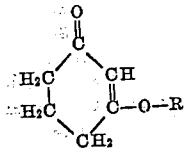

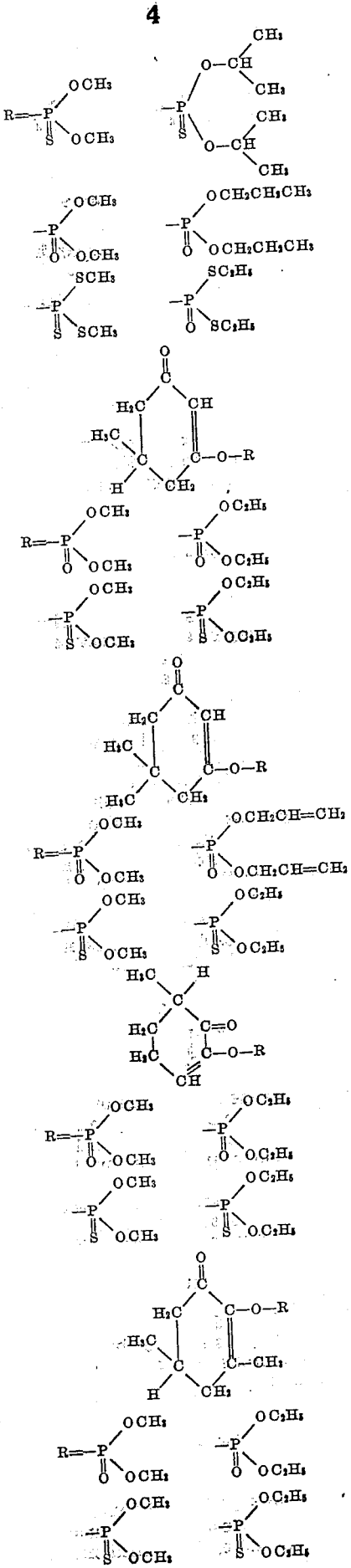

The biological properties of the new compounds can be applied in the most varied fields of pest control and the nature of the compositions used can be varied accordingly. The active compounds can be used as such, e. g., in the form of powder or dispersed in the atmosphere as gas, mist or smoke. However, for most purposes it is more economical to combine them with suitable carriers or diluents. A number of such substances, suitable for the usual forms of application, such as compositions for dusting or spraying (suspensions), solutions, aerosols, emulsions and semisolid preparations (ointments) are listed below.

Thus as solid, pulverulent carriers may be used, e. g.: calcium carbonate in the form of whiting or ground limestone, kaolin, bole, bentonite, talcum, powdered magnesia, kieselguhr, boric acid, tricalcium phosphate, also powdered wood, powdered cork and other materials of a vegetable nature. By adding wetting agents and protective colloids such pulverulent preparations may be made to give suspensions in water suitable for use as spraying agents. The active substance may be combined with the carrier by, e. g., impregnating the latter with solutions of the active agents, by mixing the molten active substances with the carriers or by milling the components together.

Solutions (for spraying) in high boiling solvents, such as kerosene and similar mineral oil fractions or in methyl-naphthalenes, xylenes and the like, are best suited for the direct spraying of the object treated, but also for impregnating wood. Solutions in low boiling solvents such as trichlorethylene, tetrachlorethane, ethylene chloride are suitable for spreading the active ingredient in the form of a mist. The latter solvents as well as, e. g., benzine, xylene and chlorobenzene are also suitable in the impregnation of packing materials.

Fluoro-trichloromethane and difluorodichloromethane are examples of solvents and propellent agents suitable for use in aerosols.

As emulsifying agents there come into consideration those of a cation active nature, such as quaternary ammonium compounds, as well as anion active agents such as soap, soft soap, aliphatic monoesters of sulphuric acid and aliphatic-aromatic sulphonic acids, furthermore, non-ionogenic emulsifiers such as higher molecular condensation products of ethylene oxide. They are mixed with the active ingredients to form emulsion concentrates with or without the addition of suitable solvents such as e. g., acetone, alcohols, cyclohexanone, benzene, toluene, xylene, tetrahydronaphthalene, alkylated naphthalenes, phthalic acid esters, mineral and vegetable oils and, if required, water.

White petroleum jelly and other ointment bases in which the active ingredient can be incorporated, are suitable semi-solid extenders.

The active compounds may also be used together with an attractive or lure such as sugar to form a bait, for instance as a dusting agent with sugar as the main carrier, or as sprays or fly catchers.

The different formulations can be better adapted for the various uses intended in the usual way, i. e. by the admixture of additives improving the distribution, adhesive powers and resistance to rain, on the treated surface. Examples of such additives are fatty acids, resins, wetting agents, glue, casein or alginates. Similarly, their biological activity can be extended by the addition of substances with bactericidal, fungicidal or insecticidal properties.

As bactericides there come into consideration, for example, chlorinated phenols and quaternary ammonium compounds; suitable fungicides include e. g., sulphur in all its various forms of application such as lime sulphur liquid, copper compounds such as copper oxychloride or Bordeaux liquid, and fluorides. As examples of further insecticidal compounds there may be named: synthetic products like 1.1-bis-(p-chlorophenyl)-2.2.2-trichlorethane, γ-hexachlorocyclohexane, hexaethyl tetraphosphate, tetraethyl pyrophosphate, chlorinated camphene and 1.2.4.5.6.7.8.8-octachloro -4.7- methano-3a.4.7.7a-tetrahydroindane and 5.5-dimethyl-dihydroresorcinol dimethylcarbamate; suitable vegetable products are pyrethrin and rotenone.

In the following examples parts are always given as parts by weight.

EXAMPLE 3

*Dusting agent*

1 part of active ingredient, e. g. dihydroresorcyl diethyl-thiophosphoric acid ester, is thoroughly ground with 99 parts of a carrier, for example, talcum. If desired, an adhesive may also be added to increase the adhesive powers of the dust coating on the plant.

EXAMPLE 4

*Spraying agent (suspension)*

10 parts of active ingredient and 10 parts of wetting and dispersing agents are very finely ground with 80 parts of a carrier. 1-5 parts of the sodium of dibutyl naphthalene sulphonic acid for example can be used as wetting agent and as dispersing agent 5-9 parts of for example, casein, blood albumin, sulphite waste liquor may be used. The carrier may be one of the following products or a mixture of two or more of them: chalk, kaolin, bentonite, etc.

EXAMPLE 5

*Emulsion*

20 parts of active ingredient are dissolved in 40 parts of a solvent and the solution is then mixed with 40 parts of an emulgator. Mixtures of benzene, toluene, xylene, acetone, lower aliphatic alcohols, petroleum fractions such as kerosene can be used as solvents. The emulgators may be anionic, kationic or non-ionogenic. As examples may be listed: sulphonates of fatty acid esters, sulphonate of ricinoleic acid butylester, quaternary compounds or condensation products of ethylene oxide with alkyl phenols or fatty alcohols.

EXAMPLE 6

*Solution (spray)*

1 part of active ingredient is dissolved in 5-9 parts of xylene and 94-90 parts of a petroleum fraction of the kerosene range.

What I claim is:

1. A phosphoric acid ester of the formula

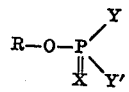

wherein R represents a radical selected from the group consisting of $\Delta^{1,2}$-cyclohexen-3-one-yl, alkyl-substituted $\Delta^{1,2}$-cyclohexen-3-one-yl, $\Delta^{1,2}$-cyclohexen-6-one-yl and alkyl-substituted $\Delta^{1,2}$-cyclohexen-6-one-yl, X represents a member selected from the group consisting of oxygen and sulphur, and Y and Y' stand for members selected from the group consisting of alkoxy, alkoxyalkoxy, halogen alkoxy and alkylmercapto groups.

2. A phosphoric acid ester of the formula:

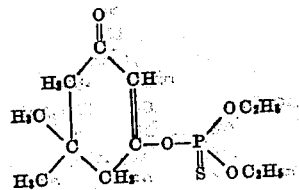

3. A phosphoric ester of the formula:

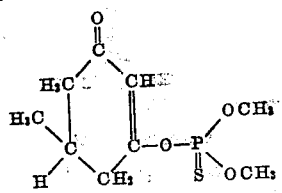

4. A phosphoric ester of the formula:

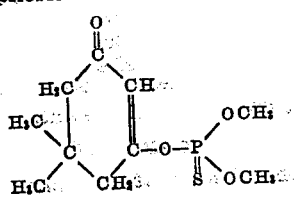

5. A phosphoric ester of the formula:

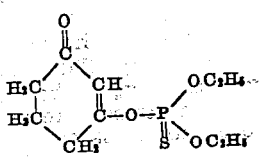

6. A phosphoric ester of the formula:

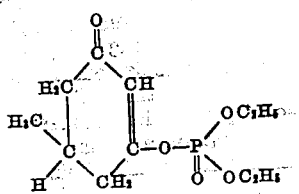

References Cited in the file of this patent

UNITED STATES PATENTS

| Number | Name | Date |
|---|---|---|
| 2,318,296 | Dickey | May 4, 1943 |

OTHER REFERENCES

Arbuzov, Chem. Abst., page 1506, (1951).